United States Patent

[11] 3,537,567

| [72] | Inventor | Casimir W. Nowicki<br>3728 Bowen Rd., Toledo, Ohio 43613 |
|---|---|---|
| [21] | Appl. No. | 788,202 |
| [22] | Filed | Dec. 31, 1968 |
| [45] | Patented | Nov. 3, 1970 |

[54] BOTTLE ORIENTING MECHANISM
6 Claims, 1 Drawing Fig.

[52] U.S. Cl................................................ 198/33;
193/43
[51] Int. Cl..................................................... B65g 47/24
[50] Field of Search........................................... 193/43(B),
43(C), 43(D); 198/33.4; 221/157, 158

[56] References Cited
UNITED STATES PATENTS

| 635,588 | 10/1899 | Pondorf...................... | 193/43 |
| 2,713,930 | 7/1955 | Koch............................ | 193/43 |

Primary Examiner—Hugo O. Schulz
Attorney—E. J. Hooler and D. R. Birchall

ABSTRACT: Apparatus for orienting bottles including a peg capable of swinging through an annular path. Bottles are delivered to the apparatus in random orientation with their center lines parallel with one another. All neck-down bottles fit over a peg and are turned to an upright position as the peg swings through its annular path. All neck-up bottles circumvent the peg and exit from the apparatus through an auxiliary chute.

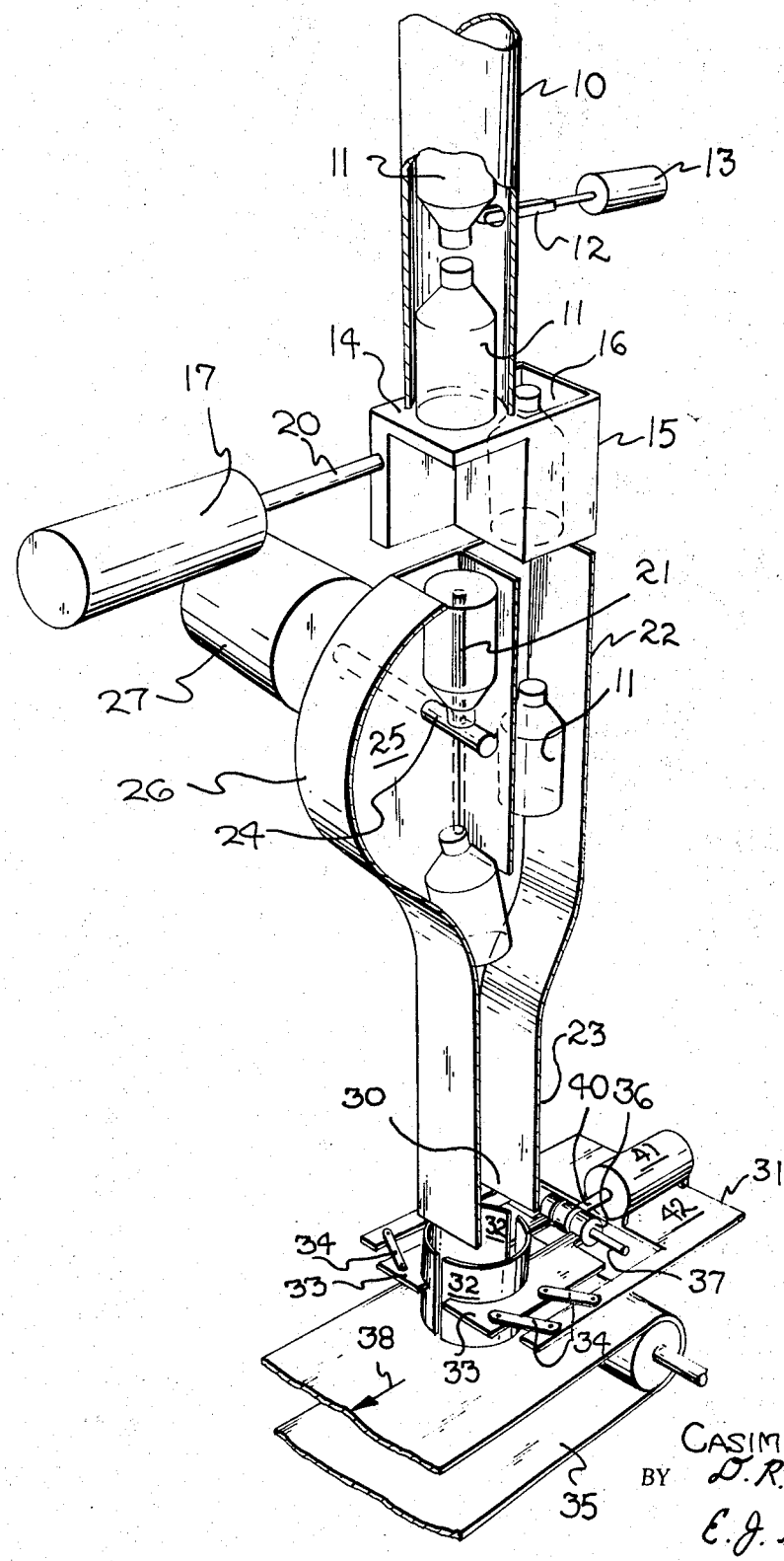

3,537,567

BOTTLE ORIENTING MECHANISM

The present invention relates to automatic apparatus for orienting containers or like articles, more particularly the present invention relates to apparatus for automatically orienting a series of containers, each consisting of a larger main body portion and a smaller neck portion attached to the open end of the main larger body.

While not specifically restricted thereto, the present invention is particularly useful for orienting lightweight plastic bottles prior to their advancement to a loading station where they are filled and capped.

The ever expanding acceptance of the packaging of liquid and solid products of every description in plastic bottles has made it virtually necessary that there be provided a dependable, simple, rapidly operating, and substantially automatic means for orienting a continuously flowing line of plastic bottles.

Because of the low density of the materials from which plastic bottles are made and the inherently high resiliency of the plastic bottles, they are very difficult to program in a manageable fashion. The bottles do not lend themselves well to orienting devices that rely upon the center of gravity of the object and the gravitational effects thereon in order to accomplish orientation.

Several prior art devices have been examined to ascertain their adaptability for sorting lightweight highly resilient plastic bottles. For example, U.S. Pat. No. 635,588 which issued on Oct. 24, 1899 sets forth a device that possesses some similarities of the present invention. Particularly, FIGS. 4—6 of U.S. Pat. No. 635,588 show an elevational view of an apparatus useful in orienting projectiles or ammunition shells. The shells are fed in a randomly oriented line to the top of the apparatus. The shells that are nose down simply slide through the device whereas those shells that enter the device nose up are caught upon a peg that rotates to swing the shell to a nose down attitude.

The device of U.S. Pat. No. 635,588 does not lend itself to the orienting of lightweight plastic bottles since the bottles do not fall with a minimum of influence from the surrounding apparatus. The resilient nature of the plastic bottles causes them to change their orientation very quickly, hence they must be subjected to a more carefully arranged guidance system than that which is provided by the apparatus described in U.S. Pat. No. 635,588.

The following specification and the drawing will point out the improvement of applicant's invention over the prior art.

It is therefore a primary object of the present invention to provide an uncomplicated economical apparatus for automatically orienting a continuous stream of neck containing containers preparatory to the packaging or filling of such containers.

Another object of the present invention is to provide an apparatus that will restrict haphazard random bouncing of an inherently resilient lightweight plastic bottle while it is being oriented by said apparatus.

An additional object of this invention is to orient each bottle that arrives at the apparatus without causing said bottle to be returned at a later time.

A further object of the present invention resides in a peg arrangement for intercepting part of the containers depending upon their orientation and a chute for accommodating containers of opposite orientation.

It is an object of the present invention to provide an apparatus wherein bottles delivered to said apparatus in a first predetermined orientation are advanced, and those bottles delivered to said apparatus in a second predetermined orientation are rotated into said first predetermined orientation before being subsequently advanced through the apparatus.

With these and other objects in mind, the present invention contemplates a bottle orienting apparatus having delivery means for conveying a single line of randomly oriented bottles from an unscrambler mechanism (not shown) to the apparatus of the present invention. The bottles are fed sequentially to the top of the apparatus. If the bottle is neck end up, the bottom of the bottle will rest upon the end of a vertically oriented peg. The upright bottle is then translated horizontally to a chute where it can drop through the apparatus and be positioned in a still upright position on, for example, a moving conveyor. If the bottle, when arriving at the top of the orienting apparatus, is neck end down it will drop over the vertically aligned peg, hence it will not be in a position to be translated horizontally. After the bottle is in position over the peg, the peg is swung through 180° thus carrying the bottle from an inverted position to an upright attitude. The completely oriented bottle is deposited into an egress chute.

The above briefly described bottle orienting apparatus will become more readily apparent to those skilled in the art from the embodiment thereof shown in the accompanying drawings and from the subsequent written description.

IN THE DRAWINGS

The single figure of the drawing shows a perspective elevational sectional view of the apparatus.

The present invention as shown in the drawing is designed specifically for lightweight plastic bottles; however, it is quite recognizable by those skilled in the art that the invention would work equally well for containers of heavier density such as glass or metal.

The present invention is considered to be an improvement over article sorting apparatus described in U.S. Pat. Nos. 635,588; 2,364,243; and 2,630,221 wherein pegs are employed in the sorting of containers. Also, the present invention provides an orienting apparatus for bottles that differ significantly from the orienting devices described in U.S. Pat. Nos. 2,630,221 and 3,166,177 which issued respectively on Mar. 3, 1953, and Jan. 19, 1965.

Referring to the drawings with particular reference to the single FIG. of the drawing, there is shown a supply tube 10 which is just slightly larger in internal diameter than the randomly oriented bottles 11 that pass there through as they arrive at the orienting apparatus from an unscrambler mechanism (not shown). Bottles 11 are metered one by one to the apparatus by a top escapement pawl 12. Escapement pawl 12 protrudes through the wall of supply tube 10 and when it is in its extended position the downward travel of bottles 11 will be arrested. The inward and outward movement of escapement pawl 12 is achieved through the reciprocal biasing force supplied by pawl actuator 13.

When a bottle 11 is permitted to pass escapement pawl 12 it comes to rest upon platform 14 of transfer chute 15. Transfer chute 15 contains a passageway 16 that communicates with supply tube 10 above and the remainder of the apparatus situated below. Lateral movement of transfer chute 15 is accomplished by transfer chute actuator 17 which is coupled by actuator rod 20 to the side of transfer chute 15.

As heretofore described, bottle 11 comes to rest upon platform 14 of transfer chute 15. Transfer chute actuator 17 is then caused to retract actuator rod 20 thus causing transfer chute 15 to move to the left of that position shown in the drawing. The support provided bottle 11 by platform 14 is removed and bottle 11 drops into passageway 16 of transfer chute 15. If the bottle is neck end up, the bottom thereof will come to rest on the end of peg 21. The next sequential movement of transfer chute 15 carries bottle 11 from its position at rest upon the end of peg 21 to a position over side chute 22. As the transfer chute 15 becomes fully positioned over side chute 22, bottle 11 falls freely into side chute 22 and is gravitationally delivered in an upright position to exit chute 23.

When a bottle is delivered to platform 14 neck end down, the rim of the bottle opening rests upon the upper surface of platform 14. As the transfer chute 15 is moved once again to the left of the view shown in the drawing, bottle 11 falls into passageway 16. Since the overall diameter of peg 21 is smaller than the orifice of the bottle 11, bottle 11 will fall down over peg 21. Bottle 11, when completely positioned on peg 21 does not interfere with the next cycle of transfer chute 15 as it moves from left to right.

Peg 21 is attached at one end to shaft 24. Shaft 24 protrudes through the wall 25 of rotation chamber 26 and is connected to reversible motor 27. As shaft 24 is rotated under the influence of motor 27, peg 21 is caused to rotate through approximately 180° thus inverting bottle 11 so that it assumes an upright position. Upon assuming an upright position, bottle 11 then slides from the confinement of peg 21 and enters exit chute 23 in an upright attitude.

Since the bottles 11, as previously indicated, are not as stable as more heavier containers, they must be stabilized as they move from the terminal end 30 of exit chute 23.

A stabilization device is shown generally at 31. The uprighted bottle 11 enters the confinement of two arcuate members 32 which are supported in juxtaposed relationship with each other. Arcuate members 32 are attached to support plates 33 by conventional means. The sides of support plates 33 are supported by a plurality of connecting bars 34. Support bars 34 are arranged in pantograph alignment so that arcuate members 32 will separate and release bottle 11 as it moves in the direction 38 of conveyor belt 35. Support plates 33 are attached at their aft edge 36 to transverse rods 37. Transverse rods 37 are coupled to actuator rod 40 of stabilization actuator 41 which in turn is mounted by suitable attachment means to base plate 42. As actuator rod 40 biases transverse rods 37 in a forward direction, aft edge attachments slide toward the outward ends of transverse rods 37. In this matter support plates 33 are free to open thus permitting bottle 11 to proceed in an upright and stabilized attitude along the transverse of conveyor belt.

The aforegoing written description makes it apparent that the specification sets forth a bottle orienting apparatus that will accept all bottles regardless of how they are oriented and discharge them continuously in one direction in the desired orientation without requiring the recycle of any containers not correctly oriented.

The present invention is advantageous in feeding small as well as large plastic bottles to a filling station where correct orientation of the bottle is a prerequisite to filling or packaging.

While a specific embodiment and details of the invention have been shown for the purpose of illustrating the invention, it will be apparent to those skilled in the art that various changes and modifications may be made therein without departing from the spirit or scope of the invention.

I claim:

1. An apparatus for orienting a series of articles having one end open and of smaller cross-sectional dimensions than the closed opposite end, said apparatus comprising: an article ingress means positioned adjacent a reciprocative transfer chute so that said articles can pass from the ingress means to the transfer chute, a rotation chamber having a rotating member including a radially aligned peg that is adapted to move into alignment with said transfer chute for the reception of said article, a side chute positioned contiguously to said radially aligned peg and communicating with said transfer chute, and egress means positioned communicatively with said rotation chamber and side chute to receive and convey said articles from said apparatus in an oriented fashion.

2. An apparatus for orienting a series of hollow articles having one end open and of substantially smaller cross-sectional dimensions than the opposite end, said apparatus comprising: an article ingress tube positioned adjacent a reciprocative transfer chute, a pawl coacting with said ingress tube to meter the flow of randomly oriented articles through said tube, a rotation chamber containing a radially aligned peg adapted to move annularly into alignment with said transfer chute for the reception of said article, a side chute positioned contiguously to said radially aligned peg and communicating with transfer chute, and exit chute positioned communicatively with said rotation chamber and side chute to receive and convey said articles from said apparatus in an oriented fashion and stabilization means positioned adjacent the exit chute for receiving and preventing the article from deviating from its oriented attitude when it is deposited upon a conveyor means.

3. An apparatus as claimed in claim 2 wherein said transfer chute contains a cavity that communicates with said ingress tube, rotation chamber, and side chute.

4. An apparatus as claimed in claim 2 wherein said radially aligned peg rotates within an annular fixed position article restricting shield.

5. An apparatus as claimed in claim 2 wherein said stabilization means comprises a pair of article encompassing arcuate members adapted to move transversely with respect to the end of the exit chute.

6. An apparatus as claimed in claim 5 wherein a conveyor means is positioned below said stabilization means to convey said articles away from said apparatus.